E. E. APPLEMAN.
DOUBLE ACTION HAIR CLIPPER.
APPLICATION FILED OCT. 9, 1911.
1,086,979.
Patented Feb. 10, 1914.
2 SHEETS—SHEET 1.
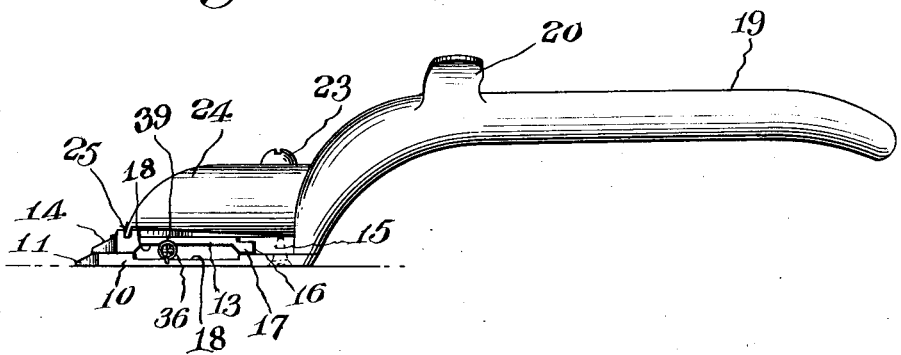
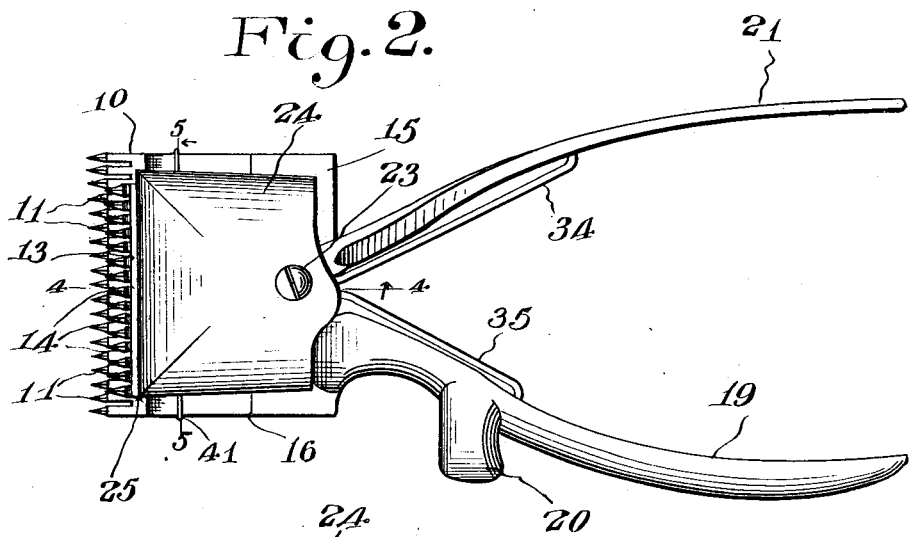
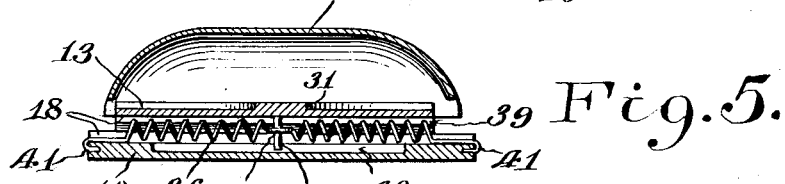
Witnesses:—
Inventor,
E. E. Appleman.
By 
Attorney

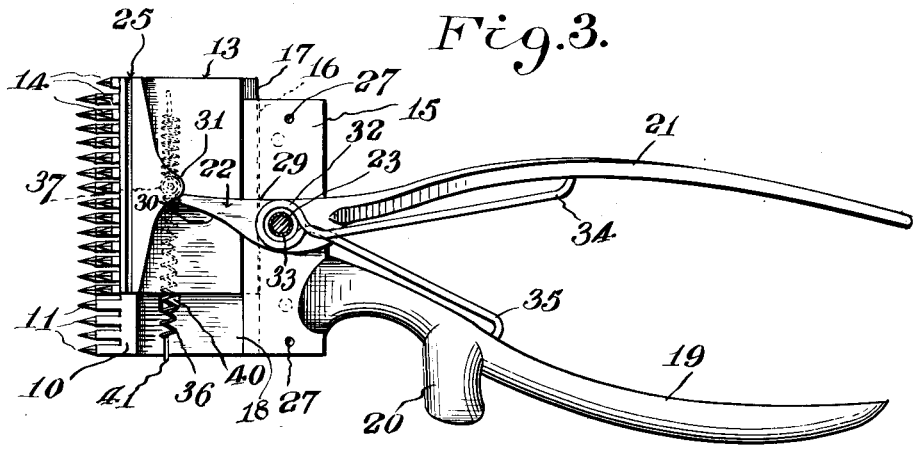
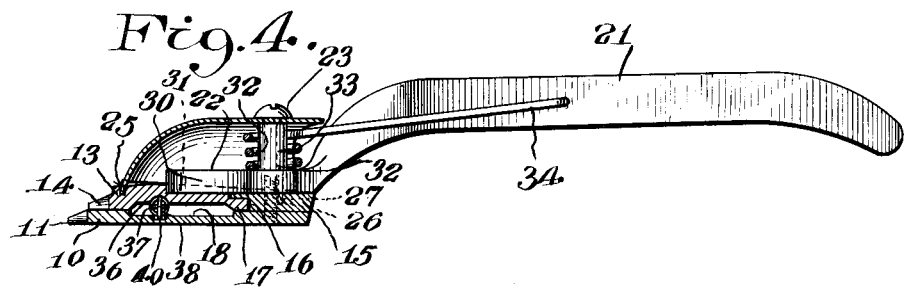
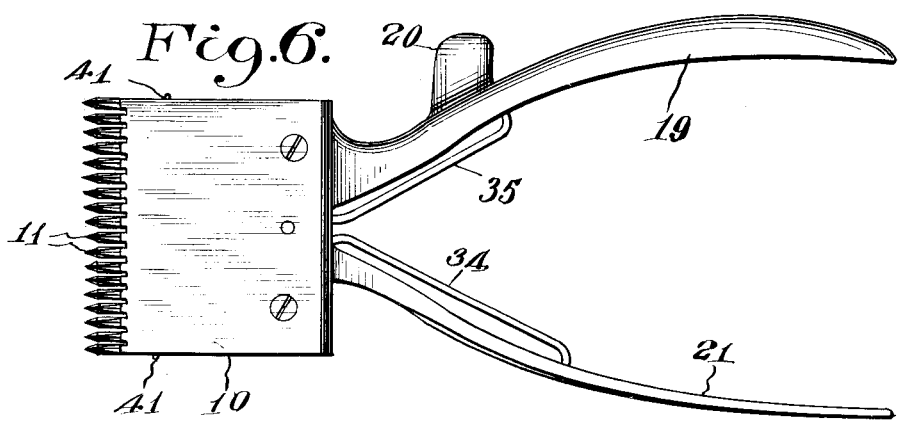

UNITED STATES PATENT OFFICE.

ERNEST E. APPLEMAN, OF JASPER, TEXAS.

DOUBLE-ACTION HAIR-CLIPPER.

1,086,979.  Specification of Letters Patent.  Patented Feb. 10, 1914.

Application filed October 9, 1911. Serial No. 653,531.

*To all whom it may concern:*

Be it known that I, ERNEST E. APPLEMAN, a citizen of the United States, residing at Jasper, in the county of Jasper and State of Texas, have invented certain new and useful Improvements in Double-Action Hair-Clippers; and I do hereby declare the following to be a full, clear, and exact description of the invention, such as will enable others skilled in the art to which it appertains to make and use the same.

This invention relates to new and useful improvements in clippers and more especially to double action hair clippers in which a single motion of the movable handle member of the clipper imparts a double motion to the clipper blade.

Another object of the invention is to provide an improved and simple form of clipper which is provided with novel cutting members and actuating means for imparting a double motion to the movable cutter blade or comb for a single motion of the handle.

With the above and other objects in view, the invention consists of certain other combinations and arrangements of parts as will be hereinafter more fully described and claimed, it being a still further object of the invention to provide a device which will not be likely to get out of working order.

In the drawings:—Figure 1 is a side elevation of my improved clipper. Fig. 2 is a top plan view thereof. Fig. 3 is a similar view partly in section and with the cover plate or casing of the clipper removed, the handles being shown compressed and the movable cutting blade shifted in an opposite position from that shown in Fig. 2 of the drawings before being automatically returned to a central position. Fig. 4 is a longitudinal sectional view on the line 4—4 of Fig. 2. Fig. 5 is a detail sectional view taken on the line 5—5 of Fig. 2. Fig. 6 is a bottom elevation of the device. Fig. 7 is a detail view of a fragmentary portion of the cover and a pin carried thereby.

Referring to the drawings in detail, there is shown a stationary cutter blade 10 forming a base member and having its forward edge provided with a series of teeth 11 of triangular cross section and with their apexes disposed downwardly while a movable cutter blade 13 of less length than the stationary blade is mounted upon the latter and at its forward edge is provided with a series of teeth 14 which are of similar cross section as the teeth 11 but which are disposed with their apexes disposed upwardly so as to present their tapered forward edges in alinement, and to permit their flat sharpened edges to coact in engagement with the similar edges of the teeth 11 during the cutting operation. A supplemental transverse plate 15 is secured upon the stationary blade 10 transversely of its rear portion and is undercut as shown at 16 to receive a downwardly offset rear edge portion 17 of the movable cutting comb or blade 13 while both the movable and stationary blades are formed with registering recesses 18, formed in the upper and lower faces of the stationary and movable blades respectively so as to permit free movement of the movable blade as it is reciprocated. A handle 19 which is secured to or formed with the plate 15 at one side thereof is provided with the usual thumb engaging projection or wing 20 while a movable handle member 21 is pivoted to the said plate and blade member 10 centrally of their lengths and for this purpose is formed at its forward end with an offset flat head 22 which is pivotally connected to said plate and blade by means of a fastening screw 23 extending through said head rearwardly of its forward end and also securing a casing 24 in position thereover while the forward end of the casing at its lower edge portion and in connection with the sides thereof slopes toward the surrounding edges of the blade members, is adapted to engage a longitudinal groove 25 in the enlarged forward portion of the movable blade member to serve as a guide for the latter member and prevent the entrance or passage of the hair clipped into the working parts and thus prevent operation of the device and the rear side corners of the casing are formed with projecting pins 26 adapted to engage in recesses 27 in the plate 15 for preventing rotation of the casing and more securely anchoring it in position.

As will be clearly seen from the drawings, one edge of the head 22 is substantially rectilinear as shown at 29 and its inner edge is curved as shown at 30 and tapers toward the straight or rectilinear edge to form a point or nose. The head is adapted for pivotal movement upon the point and its upper face is coextensive with the upper face of the movable blade member, the head being adapted to engage a central tapered enlargement 31 formed at the forward portion of said blade member so that as the movable handle is operated in opposite directions, its nose will engage the enlargement to shift the movable blade in opposite directions and release the same at the limit of its movement when reciprocated to either side edge of the stationary plate.

A coiled spring 32 is engaged around a sleeve 33 mounted upon the fastening screw between the head of the movable member and casing and has its extremities 34 and 35 disposed normally in an expanded position and bent in an angular direction to engage in apertures formed in the inner faces of the stationary and movable handle members so as to hold the latter members in a normally expanded position and permit the movable blade to lie normally in a central position. A coiled spring 36 which is normally compressed is formed at its center with an eye 37 secured centrally to the underface of the movable cutter blade by means of a pin 38 and said spring is seated in a longitudinal groove 39 in the underface of the said cutter blade while the pin is adapted to slide in a groove 40 centrally of the upper face of the stationary cutter blade while the ends of the coiled spring 36 are anchored as shown at 41 in opposite edge portions of the stationary blade, so that the spring normally holds the movable blade in a central position and as the movable handle member is reciprocated, the movable blade will be reciprocated in one direction and when released will return to an opposite position as the spring equalizes and thus when the handles are compressed two motions are imparted to the movable blade and the coiled spring 32 will separate the handles and impart a similar double motion to the movable blade in an opposite direction.

From the foregoing description in connection with the accompanying drawings, it will be seen that I have provided a very simple and efficient form of clipper and a positively operating and simple form of actuating mechanism whereby the movable cutting blade receives a double-motion upon each movement of the movable handle thus greatly facilitating the clipping operation while the formation of the teeth upon the blades serves to facilitate the cutting action and permits the hair to be readily freed therefrom.

The casing 24 at its forward edge can be properly adjusted so as to engage in the groove by means of the screw 23 which will act as a tension on the blades, making them run close enough together to cut properly as well as preventing the cut hair from getting into the working parts.

I claim:

1. In a clipper, a stationary cutter blade, a movable cutter blade mounted on the stationary blade, a centrally anchored coiled spring connected at its ends to the stationary cutter blade and centrally to the movable cutter blade to automatically return the latter to a central and normal stationary position, a stationary handle supported upon the stationary cutter blade and a movable handle carried thereby for engaging the movable blade to shift the same in opposite directions and release said movable blade at the limit of its movement in either direction for automatic return to its normal position.

2. A double action hair clipper comprising a stationary plate forming a base, said plate having a transverse recess in its upper portion and formed with teeth at its forward edge, a guide plate secured along the rear portion of said base plate and having an undercut portion providing a guideway, a movable plate having a recess in its under portion coacting with the aforesaid recess to produce an enlarged recess and having a reduced rear edge engaging in the guideway for transverse movement, said movable plate having teeth coacting with the aforesaid teeth, a coiled spring accommodated in the recess and connected centrally to the movable plate and at its ends in the stationary plate, a pin forming said connection and operating within the coacting recesses, and a handle member for reciprocating the removable plate in opposite directions and releasing the same for return to a central position.

3. In a clipper, a stationary cutting blade, a movable blade mounted thereon, means interposed between the blades for retaining them in a normally central position, said means comprising a coil spring having its center connected to one of the blades and its end connected to opposite sides of the remaining blade, a stationary handle member carried by the stationary blade, said movable blade having a recessed upper portion provided with a central tapered projection of convex form, a pivot pin centrally and vertically of the rear portion of the stationary blade and a handle member pivoted thereon and movable over the adjacent portion of the stationary blade and the recessed portion of the movable blade to engage said tapered member for shifting the movable blade in opposite directions and permitting the return of said blade to a stationary position when moved beyond and over said enlargement.

4. In a clipper, a stationary cutting blade, a movable blade mounted thereon, means interposed between the blades for retaining them in a normally central position, said means comprising a coil spring having its center connected to one of the blades and its end connected to opposite sides of the remaining blade, a stationary handle carried by the stationary blade, said movable blade having a central tapered projection, a pivot pin at the rear portion of the stationary blade and a handle pivoted thereon and movable over the adjacent portions of the stationary and movable blades to shift the movable blade and release the same for return to its initial position.

In testimony whereof, I affix my signature, in presence of two witnesses.

ERNEST E. APPLEMAN.

Witnesses:
 IRA BLAKE,
 W. W. BLAKE.